United States Patent [19]

Moran, Jr. et al.

[11] Patent Number: 4,574,138

[45] Date of Patent: Mar. 4, 1986

[54] RAPID CURE ACRYLIC MONOMER SYSTEMS CONTAINING ELEMENTAL ALUMINUM METAL

[76] Inventors: James P. Moran, Jr., 30 Paper Chase Dr., Farmington, Conn. 06032; Mark Holmes, 46 Wintergreen Dr., Quaker Hill, Conn. 06375

[21] Appl. No.: 568,311

[22] Filed: Jan. 9, 1984

[51] Int. Cl.[4] ............................................. C08K 3/08
[52] U.S. Cl. .................... 524/786; 523/176; 523/503; 523/507; 523/512; 524/719; 524/780; 524/813; 524/850
[58] Field of Search ............... 524/850, 732, 780, 719, 524/786, 813; 523/176, 512, 503, 507

[56] References Cited

U.S. PATENT DOCUMENTS

| | | | |
|---|---|---|---|
| 2,861,002 | 11/1958 | Britton | 106/177 |
| 3,151,103 | 9/1964 | Heckmaier et al. | 260/92.8 |
| 3,184,440 | 5/1965 | Chada et al. | 260/78.5 |
| 3,336,257 | 8/1967 | Alvey | 524/437 |
| 3,847,865 | 11/1974 | Duggins | 524/437 |
| 3,907,717 | 9/1975 | Hebert | 252/508 |
| 3,922,383 | 11/1975 | Wilkes et al. | 427/82 |
| 3,931,762 | 1/1976 | Fukushima et al. | 101/401.1 |
| 4,019,922 | 4/1977 | Whittum et al. | 524/437 |
| 4,048,136 | 9/1977 | Kobayashi et al. | 524/52.1 |
| 4,066,463 | 1/1978 | Chollet | 106/15 FP |
| 4,085,246 | 4/1978 | Buser et al. | 524/521 |
| 4,115,338 | 9/1978 | Kobayashi et al. | 524/521 |
| 4,177,563 | 12/1978 | Josten et al. | 524/786 |
| 4,191,677 | 3/1980 | Strand | 260/37 |
| 4,243,578 | 1/1981 | O'Sullivan et al. | 524/850 |
| 4,331,580 | 5/1982 | Bunyan | 523/176 |
| 4,347,174 | 8/1982 | Nagase et al. | 524/850 |

FOREIGN PATENT DOCUMENTS

| | | | |
|---|---|---|---|
| 1519003 | 6/1970 | Fed. Rep. of Germany | 524/437 |
| 0019528 | 6/1973 | Japan | 524/437 |
| 0104621 | 9/1978 | Japan | 524/786 |
| 671416 | 7/1949 | United Kingdom | 524/437 |
| 1595089 | 11/1977 | United Kingdom | 220/20 |

OTHER PUBLICATIONS

Derwent Abstract, 16900, E/09 (Jan. 1982) J57014635, Showa Denku KK.
Derwent Abstract, 06798, E/04 (Dec. 1981) J56101446, Showa Denku KK.
Derwent Abstract, 61122, A/34 (Jul., 1978) J53081589, Mitsubishi Rayon KK.

*Primary Examiner*—Herbert J. Lilling
*Attorney, Agent, or Firm*—Hayes Davis & Soloway

[57] ABSTRACT

Rapid cure polymerizable monomer sealing and bonding compositions are disclosed. The polymerizable compositions comprise at least one polymerizable acrylate monomer system comprising a urethane acrylate monomer having vinyl reactive ends, and at least one hydroxy-terminated, monofunctional, short chain monomer which is soluble in or miscible with the urethane acrylate monomer; an effective amount for initiation of a free radical initiator; and a compatible filler material.

39 Claims, No Drawings

RAPID CURE ACRYLIC MONOMER SYSTEMS CONTAINING ELEMENTAL ALUMINUM METAL

BACKGROUND OF THE INVENTION

1. Field of the Invention

This invention relates to polymerizable (curable) sealing and bonding (adhesive) compositions, and more particularly to compositions which contain polymerizable esters. The invention has particular application to polymerizable compositions which exhibit anaerobic curing characteristics, that is, compositions comprising polymerizable acrylate or methacrylate ester monomers and containing free radical polymerization initiators of the hydroperoxy or perester type and having the ability to remain in the fluid, unpolymerized state so long as contact with air or oxygen is maintained while at the same time being capable of rapid polymerization to the solid state upon the exclusion of air or oxygen, and will be described in connection with such application. (True anaerobics also polymerize rapidly in the presence of transition metal ions such as copper or iron.) It will be understood, however, that polymerizable compositions made in accordance with the instant invention may be cured by a variety of mechanisms in addition to anaerobic curing.

2. Prior Art

Various anaerobically curing polymerizable compositions are known in the art and are available commercially from a variety of manufacturers. Anaerobically curing compositions are commonly composed of curable unsaturated monomers, specifically acrylate or methacrylate ester monomers, in combination with one or more free radical polymerization initiators containing hydroperoxy moieties or materials that will hydrolyze in situ to hydroperoxy moieties, e.g. peresters. While the free radical polymerization initiators in the anaerobic composition are capable of polymerizing the monomers within a relatively short time (typically 30 seconds to ten minutes) on metal parts, for high speed production line applications where sealed or bonded articles cannot be stored for extended periods, and for equipment repair applications where prompt return to service is important, the highest possible rate of cure for the composition is desirable. (This assumes that the rapid cure speed does not produce overriding accompanying negative effects, such as undue embrittlement of the cured composition, or loss of other desirable properties.) Generally, for high speed production line applications the bonded parts should reach handling strength in 5 to 10 seconds. Handling strength means that the bonded parts can support their own weight by means of the cured adhesive and thus can be moved or subjected to further manufacturing processing without failure of the bond.

Of additional and particular importance in anaerobically curing compositions (as well as compositions curable by other mechanisms) is the ability to cure-through-gap. As the gap (i.e., the space between the substrates to be sealed or bonded) becomes larger, the possibility of entrainment of atmospheric oxygen increases, and the area of the adhesive which is in contact with oxygen also increases. Consequently, the inability to provide complete cure through large gaps has been a common problem with many anaerobic compositions.

It is thus a primary object of the present invention to provide an improved polymerizable sealing and bonding system (i.e. processes, materials and products) which overcome the aforesaid and other disadvantages of the prior art.

Other objects of the present invention are to provide improved anaerobically curing, sealing and bonding compositions, which compositions demonstrate extremely rapid fixture time, good adhesive strength, extended pot life and ease of application, and complete cure-through-large gaps, (i.e. in excess of 20 mil.). Yet other objects will in part appear obvious and will in part appear hereafter.

The invention accordingly comprises the processes involving the several steps and relative order of two or more of such steps with respect to each other, and the materials and compositions possessing the several features, properties and relations of elements which are exemplified by the following disclosure, and the scope of the application which will be indicated in the claims.

SUMMARY OF THE INVENTION

Generally, the foregoing and other objects of the invention are achieved by the provision of a polymerizable sealing and bonding composition which comprises (A) a polymerizable acrylic monomer system comprising a urethane acrylate monomer having vinyl reactive ends, and at least one hydroxy-terminated monofunctional short chain monomer which is soluble in or miscible with the urethane acrylate monomer; (B) an effective amount for polymerization initiation of a free radical polymerization initiator of the hydroperoxy or perester type; (C) a compatible finely divided, i.e. powdered, filler material, insoluble in the monomer system, in an amount of from about twenty percent (20%) to about seventy percent (70%) by weight of the total composition; and (D) optionally, an effective amount for stabilization of the composition of a chelating component. The polymerizable composition is further characterized by the ability to achieve at least handling strength in 3 to 10 seconds. By "compatible", it is meant that the filler material is one which (1) promotes (or at least does not interfer with) curing of the monomer system under selected curing conditions, and (2) does not cause spurious polymerization of the monomer system under storage conditions. As applied to anaerobically curable systems, the filler material is one which (1) promotes (or at least does not interfer with) curing of the monomer system under anaerobic conditions, and (2) does not cause spurious polymerization of the monomer system under aerobic conditions.

The invention also includes a method of sealing or bonding surfaces comprising applying to either or both of said surfaces the filler material containing polymerizable compositions of this invention, placing said surfaces in abutting relationship and causing the composition to cure, as by application of a primer or exclusion of oxygen.

For a fuller understanding of the nature and objects of the present invention, reference should be made to the following detailed description of the invention taken in connection with the accompanying examples.

DETAILED DESCRIPTION OF THE INVENTION AND ITS PREFERRED EMBODIMENTS

(A) The Polymerizable Acrylic Monomer System

The urethane acrylate monomers employed in the present invention may be formed by reacting a polyester diol with a diisocyanate, and reacting the resulting product with a hydroxyl-containing polymerizable acrylic or methacrylic acid ester. One preferred polyester diol is manufactured by Mobay Chemical Corporation under the trade name Desmodure 1700. The manufacturer describes this polyester diol as being derived by the reaction of diethylene glycol and adipic acid (hexanedioic acid). Another preferred polyester diol is manufactured by the Inolex Company under the Trademark Inolex 1400-120. The manufacturer describes this polyester diol as being derived by the reaction of neopentyl glycol and 1,6 hexanediol with adipic acid. Other useful polyester diols may be formed by the reaction of a glycol of at least two carbon atoms with a dicarboxylic acid of more than three carbon atoms, e.g., poly 1,4-butane diol adipate.

The preferred diisocyanate is toluene diisocyanate (TDI), although other relatively low molecular weight diisocyanates of the general formula:

$$(O{=}C{=}N)_2R \qquad (I)$$

wherein R is a $C_{2-20}$ alkylene, alkenylene or cycloalkylene radical or a $C_{6-40}$ arylene, alkarylene or aralkylene are useful.

The reaction ratio of the equivalent weights of the polyester diol to the diisocyanate generally should be in the range of about 1.0 hydroxyl equivalent of polyester diol to about 1.7 to about 2.2 isocyanate equivalents of diisocyanate. The preferred reaction ratio is 1.0 hydroxyl equivalent of the polyester diol for every 2.0 isocyanate equivalents of diisocyanate. This preferred reaction ratio yields a final composition with a chemical structure having a high degree of flexibility and isocyanate termination.

The isocyanate terminated polyester prepolymer product described above is then reacted with a hydroxyl-containing acrylate or methacrylate ester momomer, producing acrylate end-capping. The useful range of hydroxyl equivalents of the ester monomers is about 0.9 to about 3.0, the preferred being in the range of 1.8 to 2.2, and the most preferred being about 2.0 equivalents for every 2.0 isocyanate equivalents of prepolymer.

The polymerizable acrylate and methacrylate ester monomers used to cap the polyester diisocyanate reaction product may be mono- or di-functional. Monofunctional monomers are preferred. Those monofunctional monomers found most effective are selected from the group consisting of hydroxylalkyl acrylates and methacrylates, and amino alkyl acrylates and methacrylates. The most preferred polymerizable ester monomers are hydroxyethyl methacrylate and hydroxypropyl methacrylate. Additional monofunctional polymerizable ester monomers deemed useful are represented by the formula:

$$\underset{H_2C=C-C-O-R^2-X-H}{\overset{R^1\ \ O}{\vert\ \ \ \vert\vert}} \qquad (II)$$

wherein X is —O— or $$\underset{-N-}{\overset{R^3}{\vert}}$$

$R^3$ is hydrogen or lower alkyl of 1 to 7 carbon atoms; $R^1$ is selected from the group consisting of hydrogen, chlorine and methyl and ethyl radicals; and $R^2$ is a divalent organic radical selected from the group consisting of lower alkylene of 1-8 carbon atoms, phenylene and naphthylene.

Suitable hydroxy- or amine-containing materials are exemplified by, but not limited to, such materials as hydroxyethyl acrylate, hydroxyethyl methacrylate, aminoethyl methacrylate, 2-hydroxypropyl methacrylate, 3-hydroxypropyl methacrylate, 3-phenoxy-2-hydroxy propyl methacrylate, aminopropyl methacrylate, hydroxyhexyl acrylate, t-butylaminoethyl methacrylate, hydroxyoctyl methacrylate, and the monoacrylate or monomethacrylate esters of bisphenol-A, the fully hydrogenated derivative of bisphenol-A, cyclohexane diol, polyethyleneglycol methacrylate, and the like.

The end-capping reaction may be accomplished in the presence or absence of diluents. Diluents which include the hydrocarbons such as aliphatic, cycloaliphatic and aromatic hydrocarbons, for example: benzene, toluene, cyclohexane, hexane, heptane, and the like, may be employed, but other diluents, such as methyl isobutyl ketone, diamyl ketone, isobutyl methacrylate, and cyclohexyl methacrylate can also be beneficially utilized.

Other diluents which are useful conform to the formulas:

$$\left( R^6O \underset{}{\overline{\phantom{xx}}} (CH_2)_m \underset{}{\overline{\phantom{xx}}} \left[ \underset{\underset{R^8\ R^9}{\vert\ \ \vert}}{\overset{\overset{R^7\ R^7}{\vert\ \ \vert}}{C-C}} \right]_p \underset{}{\overline{\phantom{xx}}} O \underset{}{\overline{\phantom{xx}}} R^6 \right)_k \qquad III.$$

wherein $R^7$ is H, $C_{1-4}$ alkyl or hydroxyalkyl or $R^6OCH_2$—; $R^9$ is H, halogen or $C_{1-4}$ alkyl; $R^8$ is H, OH OR $R^6O$—; $R^6$ is $CH_2{=}CR^9C{=}O$; m is an integer, preferably 1 to 8; k is an integer, preferably 1 to 20; and p is 0 or 1; or $$\left( \underset{CH_2=C-C-O-R^{11}*W*E_d*W_i*}{\overset{R^{10}\ O}{\vert\ \ \vert\vert}} \right)_2 Z \qquad IV.$$

wherein $R^{10}$ is selected from the group consisting of hydrogen, chlorine, and methyl and ethyl radicals; $R^{11}$ is a bivalent organic radical selected from the group consisting of lower alkylene of 1–8 carbon atoms, phenylene, and naphthylene; W is a polyisocyanate radical; E is an aromatic, heterocyclic or cycloaliphatic polyol or polyamine radical, preferably a diol, and more preferably a diol of a cycloaliphatic compound; d is either 1 or 0; i is 0 when d is 0, and otherwise equal to one less than the number of reactive hydrogen atoms of E; wherein Z is a (i) polymeric or copolymeric grafted alkylene ether polyol radical or (ii) polymeric or copolymeric methylene ether polyol radical; z is an integer equal to the valency Z; wherein an asterisk indicates a urethane (—NH—CO—O—) or ureide (—NH—CO—NH—) linkage; Z may also be a polymeric or copolymer methylene ether polyol radical; or $$(A{-}X{-}CO.NH)_n{-}B \qquad (V)$$

wherein X is —O— or —$R^{12}$N—; $R^{12}$ is selected from the group consisting of H or lower alkyls of 1 through 7 carbon atoms; A is $CH_2{=}CR^{13}.CO.O.$—; $R^{13}$ is H, or CH₃; n is an integer from 2 to 6 inclusive; and B is a polyvalent substituted or unsubstituted alkyl, alkenyl, cycloalkyl, aryl, aralkyl, alkyloxyalkylene, aryloxy-arylene or heterocyclic radical; or $$(CH_2=CR^{14}.CO.O.R^{16}.O.CO.NH)_2-R^{15} \quad (VI)$$

wherein $R^{14}$ is R, CH₃, C₂H₅ or Cl; $R^{15}$ is a $C_{2-20}$ alkylene, alkenylene or cycloalkylene radical or a $C_{6-40}$ arylene, alkarylene, aralkarylene, alkyloxyalkylene or aryloxyarylene radical which may be substituted by 1–4 chlorine atoms or by 1–4 chlorine atoms or by 1–3 amino or mono- or di-$C_{1-3}$ alkylamino or $C_{1-3}$ alkoxy groups; $R^{16}$ is one of the following less one hydrogen atoms: (a) a $C_{1-8}$ hydroxy alkyl or aminoalkyl group, (b) a $C_{1-6}$ alkylamino-$C_{1-8}$ alkyl group; or (c) a hydroxyphenyl, an aminophenyl, a hydroxynaphthyl or an amino naphthyl group which may be further substituted by an alkyl, alkylamino or dialkylamino group, each alkyl group in this subpart (c) containing up to about 3 carbon atoms.

If desired, the diluents may also act as the hydroxy-terminated, monofunctional, short chain monomer of the composition as will be described in detail hereinafter. The most preferred diluents/monomers are hydroxyethyl methacrylate and hydroxypropyl methacrylate, and 3-phenoxy-2-hydroxypropyl methacrylate.

It will be appreciated that the urethane-acrylate monomers employed in this invention may be prepared by processes other than that described above. Thus, for instance, the polyisocyanate compound can be reacted with a suitable hydroxyacrylate or methacrylate and the resulting product reacted with a suitable glycol polyester or polyether to produce the desired prepolymer product. Alternatively a carboxylic acid terminated polyester (such as Desmodure 1700 that has been esterified with additional adipic acid to generate carboxylic acid end groups) may be reacted with glycidyl methacrylate in the presence of triethylamine or a mixture of triethylamine and 2 methyl-imidazole to produce a methacrylate terminated polyester prepolymer having no urethane or urea linkages.

The hydroxy-terminated, mono-functional, short-chain monomers found most effective in the present invention are hydroxyl-containing acrylate or methacrylate ester monomers. Preferred are hydroxyalkyl acrylates and hydroxyalkyl methacrylates, the most preferred being 2-hydroxyethyl methacrylate (HEMA) and 2-hydroxypropyl methacrylate (HPMA). Other suitable hydroxy-terminated monomers include hydroxyethyl acrylate, 2-hydroxypropyl acrylate, 3-phenoxy-2-hydroxypropyl methacrylate, hydroxyhexyl acrylate, and hydroxyoctyl methacrylate which are given as exemplary.

Another class of urethane acrylate monomers that may be used in the present invention may be prepared by reacting 1-hydroxyethyl methacrylate, 2-hydroxyethyl acrylate, 2-hydroxypropyl methacrylate or 2-hydroxypropyl acrylate and a isocyanate. For example, the foregoing acrylates or methacrylates may be reacted with phenylisocyanate to produce the corresponding phenylurethane of the methacrylate or acrylate or hydroxy ester. One preferred monofunctional monomer prepared in accordance with the foregoing is the reaction product of 2-hydroxyethyl methacrylate with phenylisocyanate thereby forming 2-methacryloxyethyl phenylurethane. Other preferred urethane monomers may be prepared by reacting one equivalent (1 mole) of a lower alcohol such as methyl-, ethyl-propyl-, n-butyl-, isobutyl- or isopentyl-alcohol with two equivalents (1 mole) of 2,4 toluene diisocyanate to produce the corresponding 2-isocyanate-4-urethane toluene monoisocyanate product. The resulting monoisocyanate product is then reacted with one equivalent (1 mole) with a hydroxy-acrylate or methacrylate ester or an amino alkyl acrylate or methacrylate to produce the corresponding acrylate or methacrylate urethane ester. Amongst preferred monofunctional monomers prepared are mentioned: the reaction product of methanol, 2-hydroxymethacrylate and toluene diisocyanate thereby forming 4-methoxycarbonylamino-2-(2-methacryloxy)ethoxycarbonylamino-toluene; and, the reaction product of isopentyl alcohol, 2-hydroxyethylmethacrylate and toluene diisocyanate thereby forming 4-isopentyloxycarbonylamino-2-(2-methacryloxy)ethoxycarbonylamino toluene which are given as exemplary.

The effective range of the polymerizable acrylic monomer system to be used in the instant compositions may vary somewhat depending on the specific properties desired, but generally about thirty (30%) to about seventy percent (70%) of the total composition is desirable and preferably within the range of about forty percent (40%) to about sixty percent (60%) by weight thereof. The polymerizable acrylic monomer system typically will comprise from about ten percent (10%) to about seventy percent (70%) by weight of the urethane acrylate monomer; preferably the urethane acrylate monomer will comprise about twenty percent (20%) by weight of the polymerizable acrylic monomer system.

It also may be desirable to add a polyfunctional monomer to the composition as well. When this is done, it generally should be in the range of about one to seventy-five percent (1% to 75%) by weight, of the polymerizable acrylic monomer system. The preferred polyfunctional monomers are dimethacrylates of various glycols. These monomers are disclosed in U.S. Pat. No. 3,218,305. Examples of some preferred glycol dimethacrylates are polyethylene glycol dimethacrylate and dipropylene glycol dimethacrylate.

(B) The Powdered Filler Material

A key feature of this invention is the use of powdered, filler material. As noted supra, the powdered filler material should be compatible with the monomer system such that on the one hand the material should not interfere with curing of the monomer system under selected curing conditions, and on the other hand the material should not be so active as to cause spurious polymerization of the monomer system under storage conditions. It has been found that the inclusion of selected finely divided, i.e. powdered, filler materials in a polymerizable composition comprising polymerizable urethane acrylate monomers and containing free-radical polymerization initiators or the hydroperoxy or perester type increases substantially the cure speed of the polymerizable composition under selected polymerization conditions without adversely affecting storage life. The powdered filler materials should be substantially insoluble in the monomer system, and should be hydrophilic and at least partially hydrated. While it is not known for certain why the addition of hydrated finely divided hydrophilic filler material to a polymerizable acrylic monomer system comprising a free radical initiator increases substantially the cure speed of the monomer system, it is believed that surface hydroxyls on the finely divided particles provide initiation sites under polymerization conditions resulting in rapid propagation of the polymerization along filler sites. Similar effects have been observed by adding to a polymerizable acrylic monomer system comprising a free radical initiator and dried finely divided hydrophilic inorganic or organic filler sufficient (distilled) water to hydrate the filler. That the hydrated finely divided filler material is responsible for the unique consequences achieved is quite clear, inasmuch as polymerizable acrylic monomer systems prepared from the same monomers and free radical initiators using the same vacuum dried finely divided inorganic fillers or organic fillers without added water, or using finely divided hydrophobic or non-aqueous wettable organic filler materials and added water, failed to provide comparable results.

Two classes of filler materials are suitable for use in the invention. The first class consists of hydrophilic inorganic materials. A particularly preferred inorganic filler material which meets the aforesaid criteria is powdered aluminum. The powdered aluminum filler material may comprise one or a mixture of two types. The first type consists of elemental (so-called atomized) aluminum (metal) powder. Atomized aluminum metal powder is available commercially from a number of sources and is produced by high pressure jet ejection of high grade molten aluminum into hot air or steam. The presently preferred atomized aluminum metal powder is Aluminum 101 powder available from Alcoa Company, Pittsburgh, PA. The manufacturer describes this product as comprising steam ejected aluminum metal particles of about 99.7% purity, and having a generally spherical particle shape and an average particle diameter of 17 to 24 microns. The particles are contained within a protective coating of aluminum oxide ($Al_2O_3$) of approximately 50 Å thickness which results from the atomization process. The second type of powdered aluminum filler material consists of high purity hydrated aluminum oxide $Al_2O_3$ (alumina). High purity aluminum oxide is available commercially from a variety of sources.

As is well known in the art, metal concentrations of one part per million or less may cause spurious polymerization problems of acrylic monomer systems. The reason why the aforesaid forms of powdered aluminum and particularly the elemental form provide superior cure speed without causing spurious polymerization problems at such high concentration levels is not well understood. Without wishing to be bound to any specific theory, it may be hypothesized that the oxide layer on the aluminum particles creates a barrier to the polymerization acceleration process in the presence of oxygen, but upon exclusion of oxygen the hydrated aluminum oxide surface on the aluminum particles are believed to provide centers of polymerization and thus lower the gel point of the polymerization. Moreover, powdered aluminum is unique in this respect inasmuch as other forms of elemental aluminum as well as other metals such as copper, zinc, cadmium, iron and the like produce unacceptable spurious polymerization problems. Moreover, only acrylic monomer systems comprising a urethane acrylate monomer having vinyl reactive ends, and at least one hydroxy-terminated, monofunctional, short-chain monomer as above described respond in the foregoing manner to the inclusion of the powdered alumina, aluminum or other hydrated fillers. Other powdered inorganic filler materials which meet the aforesaid criteria include barium sulfate, calcium carbonate, silica and magnesium hydroxide, and mixtures of two or more thereof, and/or with powdered aluminum. The inorganic filler materials should be finely divided materials of high purity, and in particular, should be substantially free of transition metal contaminants such as iron or copper which are known to produce spurious polymerization of anaerobic monomer systems. Such materials are readily available commercially from a variety of sources.

The other class of filler materials useful in the invention consists of hydrophilic organic materials. The organic filler materials should be substantially insoluble in the monomer systems, and should be solid under ambient conditions. Suitable organic filler materials include the meta and para isomers of phenyldimaleimide.

The amount of hydration necessary to achieve the desired cure speed will vary within the relative amounts and species of the polymerization initiation and the polyester-urethane and other components such as crosslinking agents present in the monomer system. One skilled in the art readily may determine sufficient levels of hydration by simple experimentation.

Useful compositions in accordance with the invention may comprise from about twenty percent (20%) to about seventy percent (70%) by weight powdered filler material, and preferably comprise from about forty percent (40%) to about sixty percent (60%) by weight powdered filler material. It has been observed that fixture times and structural (shear) strength falls off drastically for compositions having less than about twenty percent by weight powdered filler material while at powdered filler material concentrations in excess of about seventy percent (70%), adhesive (bond) strength begins to fall off.

THE INITIATOR SYSTEM

The initiator system comprises a free-radical initiator of the hydroperoxy or perester type. Included within this definition are materials such as organic hydroperoxides or organic peresters which hydrolyze to produce hydroperoxides in situ.

Typical examples of such organic hydroperoxides are cumene hydroperoxide, tertiary butyl hydroperoxide, methylethylketone hydroperoxide, and hydroperoxides formed by oxygenation of various hydrocarbons such as methylbutene, cetane and cyclohexene and various ketones and ethers, including certain compounds represented by the general formula VIII(B) above. Still other initiators are disclosed in U.S. Pat. No. 4,007,323 issued Feb. 8, 1977 to Bernard Miles Malofsky.

The polymerization initiator system which is used commonly comprises less than about 10 percent by weight of the combination of the polymerizable monomer system and initiator and preferably comprises from about 0.1 percent to about 5 percent of the combination.

Ultraviolet ("uv") activated initiators may also be employed as polymerization initiators. Many uv activated polymerization initiators are known in the art and may be advantageously employed in the invention. For example, the uv activated initiators may be selected from metal carbonyls of the formula $M_x(CO)_y$ wherein M is a metal atom, x is 1 or 2, and y is an integer determined by the total valence of the metal atoms, generally 4 to 10. The preferred uv activated initiators are selected from (a) $C_{1-16}$ straight or branched chain alkyl diones; and (b) carbonyl compounds of the general formula $R^5(CO)R^6$ wherein $R^5$ is a $C_{1-10}$ alkyl, aryl, aralkyl or alkaryl group, and $R^6$ is $R^5$ or hydrogen. In addition, $R^5$ or $R^6$ can contain any substituents which do not adversely affect the compound in serving its function. For example, $R^5$ or $R^6$ can be alpha-substituted with an alkyl, aryl, alkaryl alkoxy or aryloxy radical, or with an amino or a mono- or dialkylamino derivative thereof, each of the above substituents containing up to about six carbon atoms. In addition, $R^5$ and $R^6$ taken together with carbonyl group form an aromatic or heterocyclic ketone containing up to about 16 carbon atoms. When using uv activated initiators it is frequently desirable to add low levels, such as up to about 500 parts per million by weight, of a free-radical or uv stabilizer, many of which are known in the art, to prevent spurious polymerization of the composition prior to the time of its intended use. Suitable free-radical stabilizers are hydroquinone, p-benzoquinone, butylate of hydroxytoluene, and butylate of hydroxyanisole.

OTHER INGREDIENTS

It is optional, but recommended, that chelators, cross-linking agents, and inhibitors be present in the polymerizable compositions of the present invention for optimum performance.

It also is deemed desirable to include a minor amount (e.g. from about 0.1 to about 1% by weight) of a metal chelating agent in the polymerizable compositions. The metal chelating agents may be chosen from any of those commonly known to the person reasonably skilled in the art for use in anaerobically curing compositions. The presently preferred metal chelating agents are ethylenediamine tetraacetic acid (EDTA), and its sodium salt, 1,1-ethylenebis-nitril methylidyne dipyridine and the class of beta-diketones are generally the most effective and are preferred. For a more detailed discussion of these and other metal chelating agents see U.S. Pat. Nos. 4,038,475 and 4,262,106.

The inhibitor concentration left over in the monomers from manufacture often is high enough for good stability. However, to insure maximum shelf life, additional inhibitors at about 0.1 to about 1% by weight of the composition are recommended. Of these inhibitors which have been found of adequate utility is the group consisting of hydroquinones, benzoquinones, naphthoquinones, anthraquinones, phenanthraquinones, and substituted compounds of any of the foregoing. Additionally, various phenols can be employed as inhibitors, the preferred one being 2,6-di-tert-butyl-4-methyl phenol.

It also is useful, but not required, to incorporate an adhesion promoter into the polymerizable composition. The adhesion promotors may be chosen from any of those commonly known to the person reasonably skilled in the art. The presently preferred adhesion promoter is of the well-known silane type and may be used in proportions of from zero to about 5% by weight of the polymerizable composition.

Also useful, but not required is a thixotropic agent. The thixotropic agent may be chosen from any of those commonly known to the person reasonably skilled in the art. The presently preferred thixotropic agent is fumed silica ($SiO_2$). The latter is available commercially from Degussa, Inc. under the Tradename Aerosil 200. Generally the thixotropic agent will be used in amount of from about zero to about 5% by weight of the polymerizable composition.

Also required to achieve an optimum speed of cure is a surface activator or primer. This latter ingredient is not included in the polymerizable composition due to its extreme activity and tendency to destroy the shelf stability of the polymerizable composition, but rather is separately applied to the surface of a substrate to be bonded prior to application of the composition. However, it is also feasible for the curable portion of the polymerizable composition to be put on a substrate and the activator applied over it. The primer serves to further increase speed of cure. Two types of activators are preferred. One type comprises aldehyde-amine condensation products, the preferred example being butyraldehyde-aniline. Activators of this type are sold commercially by E. I. Dupont de Nemours & Co. under the name Beutene. The condensation products are usually in a solvent solution such as trichlorethane, or similar solvents, for easy application. The other type comprises substituted thioureas as disclosed in, for example U.S. Pat. Nos. 3,591,438, 3,625,930 and 3,970,505.

Cross-linking agents optionally present in amounts from about zero to about 25% of the polymerizable composition, include such compounds as copolymerizable dimethacrylates.

EXAMPLES

The invention will now be illustrated by the following description of certain preferred embodiments thereof, given by way of example only.

PREPARATION A

To a four-necked resin kettle equipped with a dry air sweep, a stainless steel stirrer, a nitrogen inlet tube, thermometer, condensor and stopcocks on entrance ports to allow evacuation, charge 4114.80 grams of Desmodure 1700 polyester diol available from MOBAY Chemical Corporation—this polyester diol is formed by the reaction of diethylene glycol and adipic acid. Heat kettle to 100° to 110° C. under vacuum for 60 minutes. Start dry air sweep and cool kettle to 40° C. and add in one shot 543.28 grams of 2,4 toluene diisocyanate (MOBAY TDI). Upon the completion of the TDI addition, heat resin kettle with stirring (75° C. for three hours); check for NCO, add calculated amount of 2-hydroxyethylmethacrylate (HEMA)—approximately 475 grams, and heat with stirring for four hours at 75° C. Recheck for the absence of NCO by IR analysis. The resulting solution contains an approximately 100 percent concentration of bis(2-methacryloxyethyl urethane) of polydiethylene glycol adipate polyester, (designated as HTRTH) corresponding to the general formula (HEMA-TDI-D1700-TDI-HEMA).

PREPARATION B

To a dry air swept, heated (approximately 40° C.) resin kettle, equipped as in PREPARATION A, charge 165 grams of toluene diisocyanate (MOBAY TDI). Slowly add 460 grams of (Inolex 1400-120 polyester, Inolex Company, Philadelphia, PA.) 1,6-hexanediol/neopentyl glycol adipate (PE) over 20 minutes. At the completion of the polyester addition, continue heating with stirring (40° to 45° C.) for one hour, followed by two hours heating with stirring at 100° C. Upon completion of the three-hour reaction period, lower the bath temperature to 50° C., and add 230 grams of 2-hydroxyethylmethacrylate (HEMA). Heat the reaction mixture to 50° C. with stirring for two hours; then add, with stirring, 1378 grams of Rohm & Haas QM-657 dicyclopentyloxyethyl methacrylate (MA), and 146 grams of Rohm & Haas acrylic acid. The resulting solution comprises polyester-urethane-methacrylic resin diluted in monomer (designated as PEUMA).

PREPARATION C

To a dry air swept, heated (60° C.) resin kettle, equipped as described in PREPARATION A, charge 2614.38 grams of 2-hydroxyethylmethacrylate (HEMA) followed by the addition at a rate of approximately 5.97 grams per minute of 2332.99 grams of phenyl isocyanate. The temperature of the reaction mixture is maintained at 58° to 60° C. After completion of the phenyl isocyanate addition, heat with stirring at 50° to 60° C. for two hours; check for NCO content by IR analysis. Continue heating with stirring until NCO disappears, add approximately 10 grams of 2-hydroxyethyl methacrylate (HEMA), and stir and heat until NCO disappears (IR analysis). A solid, crystalline product (MP 60°) 5007.37 grams of 2-methacryloxyethyl phenylurethane (designated as 2MEP) results.

EXAMPLES 1 and 2

Table I shows two rapid cure adhesive compositions containing powdered aluminum filler material and made in accordance with the instant invention.

TABLE I

| INGREDIENTS | FORMULATION NO. | |
| --- | --- | --- |
|  | 1 | 2 |
|  | Parts by Weight | |
| HTRTH | — | 20.75 |
| PEUMA | 5.99 | — |
| Tetrahydrofurfuryl methacrylate | 4.80 | — |
| 2-hydroxyethyl methacrylate | — | 11.20 |
| 2-hydroxypropyl methacrylate | 4.80 | — |
| Methacrylic acid | 2.10 | — |
| Saccharin | 0.35 | 1.10 |
| Cumene hydroperoxide | 1.59 | 1.71 |
| Aluminum Oxide (hydrated) | 64.66 | 65.00 |
| Butylated hydroxy toluene | 0.02 | 0.02 |
| Chelators | 0.22 | 0.22 |
| Aerosil 200 | 0.88 | — |
| Ethoxylated Bis Phenol A Dimethacrylate | 14.38 | — |

HTRTH is prepared as in PREPARATION A.
PEUMA is prepared as in PREPARATION B.
Aluminum Oxide C-331 is a hydrated alumina product available from Alcoa.
Aerosil 200 is a fumed silica product available from Degussa, Inc.

The compositions were tested for curing properties by applying one drop (apparently 0.05 grams) of the activator Beutene, (an amine-aldehyde condensate diluted in a solvent (30%) manufactured by E. I. DuPont de Nemours Co.) to the surfaces of two ground steel tensile shear test panels (1"×4"×0.0464") and allowed to dry for 60 seconds at room temperature. To one side of one of the prepared specimens place a drop (approximately 0.10 grams) of the polymerizable part of the adhesive compositions (FORMULATION Nos. 1 and 2). Assemble the test panels, spreading the adhesive between them and hold by hand for three to ten seconds. After three to ten seconds the panels are fixtured to each other. The assembled panels were tested in a Dillon Tensile Testing Machine and demonstrated approximately 1000 psi strength at 20 seconds. Full cure occurs in 4 to 24 hours, with ultimate strength of 2000 to 3000 psi.

EXAMPLES 3 and 4

Elemental aluminum (metal) powder, Al 101 available from Aluminum Company of America was substituted for the Alcoa C-331 aluminum oxide used in Examples 1 and 2, and similar results were observed.

EXAMPLE 5

The polyester-urethane-methacrylate resin (PEUMA) used in Example 1 was replaced by an equivalent weight of 2-methacryloxyethyl phenylurethane (2MEP) prepared as in Preparation C, and similar results were observed.

EXAMPLES 6 to 9

Table III shows four additional rapid cure compositions containing powdered inorganic filler material and made in accordance with the instant invention.

TABLE III

| INGREDIENTS | FORMULATION NO. | | | |
| --- | --- | --- | --- | --- |
|  | 6 | 7 | 8 | 9 |
|  | PARTS BY WEIGHT | | | |
| PEUMA | 5.99 | 5.99 | 5.99 | 5.99 |
| Tetrahydrofuryl methacrylate | 4.80 | 4.80 | 4.80 | 4.80 |
| 2-hydroxypropyl methacrylate | 4.80 | 4.80 | 4.80 | 4.80 |
| Methacrylic acid | 2.10 | 2.10 | 2.10 | 2.10 |
| Saccharin | 0.35 | 0.35 | 0.35 | 0.35 |
| Cumene hydroperoxide | 1.59 | 1.00 | 5.00 | 2.00 |
| Butylated hydroxy toluene | 0.02 | 0.02 | 0.02 | 0.02 |
| Chelators | 0.22 | 0.22 | 0.22 | 0.22 |
| Aerosil 200 | 0.88 | 0.88 | 0.88 | 0.88 |
| Ethoxylated Bis Phenol A Dimethacrylate | 14.38 | 14.38 | 14.38 | 14.38 |
| Barium Sulfate | 65 | — | — | — |
| Calcium Carbonate | — | 50 | — | — |
| Silica | — | — | 20 | — |
| Magnesium hydroxide | — | — | — | 23 |

The Formulations were tested for curing properties by applying the adhesive to steel test panels as before. In each case fixturing was observed to occur in three to ten seconds. The assembled panels were tested in a Dillon Tensile Testing Machine as before. Tensile strengths measured between 860 and 1375 psi after 20 seconds depending on the Formulation. Full cure occurred in 4 to 24 hours, with ultimate strength of 1500 to 3000 psi.

EXAMPLE 10

Table IV shows an additional rapid cure composition containing powdered organic filler material (N,N-metaphenyldimaleimide in place of the inorganic filler material), and made in accordance with the instant invention.

TABLE IV

| INGREDIENTS | FORMULATION NO. 10 PARTS BY WEIGHT |
| --- | --- |
| HTRTH | 5.83 |
| 2-hydroxypropyl methacrylate | 4.67 |
| N—N, meta-phenyldimaleimide | 8.58 |
| Ethoxylated Bis Phenol A Dimethacrylate | 14.00 |
| Aluminum Oxide (filler) | 65.00 |
| Cumene Hydroperoxide | 1.60 |
| Saccharin | 1.02 |

TABLE IV-continued

| INGREDIENTS | FORMULATION NO. 10 PARTS BY WEIGHT |
|---|---|
| Chelators | 0.19 |
| Butylated hydro toluene | 0.02 |

The resulting Formulation was tested for curing properties as before. Fixturing was observed to occur in three to ten seconds.

As will be appreciated, the foregoing invention provides novel and improved rapid cure acrylic monomer adhesive systems. The adhesive systems of the present invention have the ability to cure through large gaps. Moreover, the cured adhesives have excellent resistance to thermal cycling, and, in the case of the aluminum and alumina filled adhesives exhibit good thermal conductivity. The cured compositions have excellent adherence to plastics, metal, glass and wood and are hydrolytically stable. Additionally, adhesive materials made in accordance with the present invention exhibit a high degree of fluidity and are readily dispensible in comparison to filled adhesive materials of the prior art.

The invention has been described particularly with application to anaerobically curing polymerizable adhesive systems for use as adhesives. However, one skilled in the art will appreciate that the polymerizable compositions of the present invention are not limited to anaerobically curing systems for use as structural adhesives. For example, the polymerizable compositions also may be employed as machinable fillers. For such applications it may be preferred to include ultraviolet ("uv") initiators in the polymerizable compositions. Moreover, the powdered inorganic filler material provides a reinforcing material in the polymerizable compositions of the instant invention which produces an extremely tough adhesive. Still other changes will be obvious to one skilled in the art.

We claim:

1. A polymerizable composition comprising, in combination:
   (1) at least one polymerizable acrylic monomer system comprising a urethane acrylate monomer having vinyl reactive ends, and at least one hydroxy-terminated, monofunctional, short-chain monomer which is soluble in or miscible with the urethane acrylate monomer;
   (2) an effective amount for initiation of a free radical initiator; and
   (3) a compatible, powdered filler material comprising elemental (atomized) aluminum metal powder in an amount in the range of from about 20% to about 70% by weight of the total composition,
said composition being further characterized by the ability to achieve handling strength in 3 to 10 seconds.

2. The polymerizable composition of claim 1, wherein said powdered filler material is (a) substantially insoluble in said monomer system, (b) normally solid at ambient conditions, (c) hydrophilic, and (d) at least partially hydrated.

3. The polymerizable composition of claim 2, wherein said powdered filler material comprises elemental aluminum and at least one additional powdered inorganic material.

4. The polymerizable composition of claim 2, wherein said powdered filler material comprises elemental aluminum and at least one powdered organic material.

5. The polymerizable composition of claim 2, wherein said powdered filler material is present in an amount in the range of from about 40 to about 60% by weight of the total composition.

6. The polymerizable composition of claim 1, wherein said elemental aluminum metal powder is derived by high pressure ejection of molten aluminum into hot air or steam.

7. The polymerizable composition of claim 3, wherein said additional powdered inorganic filler comprises powdered alumina.

8. The polymerizable composition of claim 3, wherein said additional powdered inorganic filler comprises barium sulfate.

9. The polymerizable composition of claim 3, wherein said additional powdered inorganic filler comprises calcium carbonate.

10. The polymerizable composition of claim 3, wherein said additional powdered inorganic filler comprises silica.

11. The polymerizable composition of claim 3, wherein said additional powdered inorganic filler comprises magnesium hydroxide.

12. The polymerizable composition of claim 4, wherein said powdered organic filler comprises meta- or para-phenyldimaleimide.

13. The polymerizable composition of claim 1, wherein said urethane acrylate monomer comprises about 10 to about 70% by weight of said monomer system.

14. The polymerizable composition of claim 1, wherein said urethane acrylate monomer comprises a monofunctional acrylate monomer.

15. The polymerizable composition of claim 1, wherein said urethane acrylate monomer comprises a polyfunctional acrylate monomer.

16. The polymerizable composition of claim 1, wherein said urethane acrylate monomer comprises a polyester-urethane prepolymer in which the polyester portion of said polyester-urethane prepolymer is a polyester diol.

17. The polymerizable composition of claim 16, wherein the polyester diol is the reaction product of neopentyl glycol with 1,6-hexane diol adipate.

18. The polymerizable composition of claim 16, wherein the polyester diol is the reaction product of diethylene glycol and adipic acid.

19. The polymerizable composition of claim 1, wherein said free radical initiator comprises an organic hydroperoxide compound.

20. The polymerizable composition of claim 1, wherein said free radical initiator comprises an organic perester compound.

21. The polymerizable composition of claim 1, wherein said powdered filler material comprises a mixture of alumina and elemental aluminum.

22. The polymerizable composition of claim 1, wherein said powdered filler material comprises a mixture of elemental aluminum and one or more of the following materials: alumuna, barium, sulfate, calcium, carbonate, silica and magnesium hydroxide.

23. The polymerizable composition of claim 1, and further comprising a metal chelator.

24. The polymerizable composition of claim 1, and further comprising a thixotropic agent.

25. The polymerizable composition of claim 1, and further comprising saccharin.

26. The polymerizable composition of claim 1, and further comprising distilled water.

27. The polymerizable composition of claim 1, wherein said filler material is present in an amount in the range of from about 40 to about 60% by weight of the total composition.

28. The polymerizable composition of claim 1, wherein said urethane acrylate monomer comprises about 10 to about 70% by weight of said monomer system.

29. The polymerizable composition of claim 1, wherein said urethane acrylate monomer comprises a monofunctional acrylate monomer.

30. The polymerizable composition of claim 1, wherein said urethane acrylate monomer comprises a polyfunctional acrylate monomer.

31. The polymerizable composition of claim 30, wherein said urethane acrylate monomer comprises a polyester-urethane prepolymer in which the polyester portion of said polyester-urethane prepolymer is a polyester diol.

32. The polymerizable composition of claim 31, wherein the polyester diol is the reaction product of neopentyl glycol with 1,6-hexane diol adipate.

33. The polymerizable composition of claim 31, wherein the polyester diol is the reaction product of diethylene glycol and adipic acid.

34. The polymerizable composition of claim 1, wherein said free radical initiator comprises an organic hydroperoxide compound.

35. The polymerizable composition of claim 1, wherein said free radical initiator comprises an organic perester compound.

36. The polymerizable composition of claim 1, and further comprising a metal chelator.

37. The polymerizable composition of claim 1, and further comprising a thixotropic agent.

38. The polymerizable composition of claim 1, and further comprising saccharin.

39. The polymerizable composition of claim 1, and further comprising distilled water.

* * * * *